(No Model.)

T. G. CLIFFORD.
WHEEL DRAG.

No. 572,356.  Patented Dec. 1, 1896.

Witnesses
J. H. Shumway
Lillian D. Kelsey

Thomas G. Clifford,
Inventor
By Attys
Earle & Seymour

United States Patent Office.

THOMAS G. CLIFFORD, OF HOBOKEN, NEW JERSEY, ASSIGNOR OF ONE-HALF TO AUGUST HARTKORN, JR., OF SAME PLACE.

WHEEL-DRAG.

SPECIFICATION forming part of Letters Patent No. 572,356, dated December 1, 1896.

Application filed June 29, 1896. Serial No. 597,407. (No model.)

*To all whom it may concern:*

Be it known that I, THOMAS G. CLIFFORD, of Hoboken, in the county of Hudson and State of New Jersey, have invented a new Improvement in Wheel-Drags; and I do hereby declare the following, when taken in connection with the accompanying drawings and the letters of reference marked thereon, to be a full, clear, and exact description of the same, and which said drawings constitute part of this specification, and represent, in—

Figure 1:
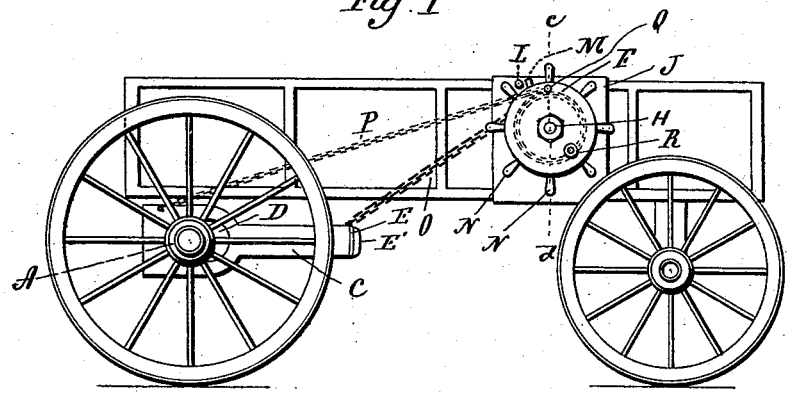
Figure 2:
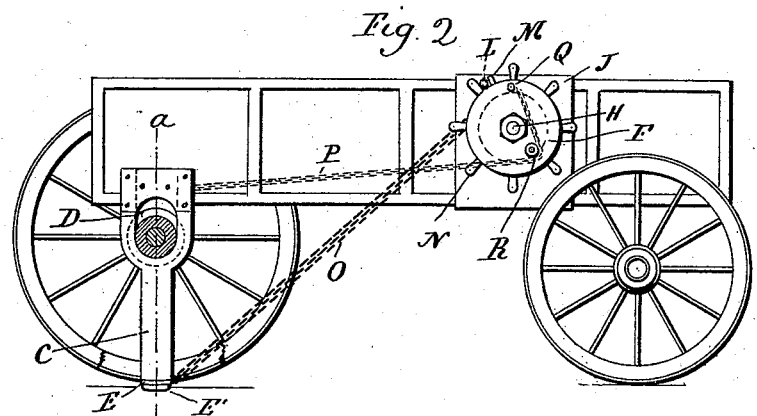
Figure 3:
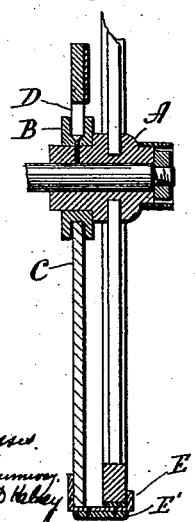
Figure 5:
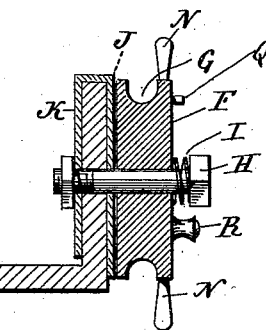
Figure 4:
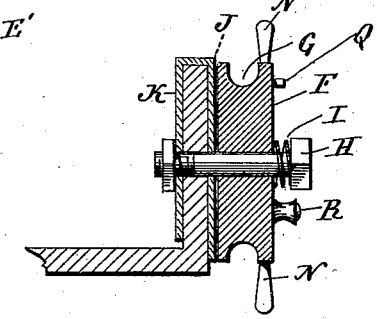

Figure 1, a side view of a cart, showing my drag applied thereto in an elevated position; Fig. 2, a similar view with the drag in the operating position; Fig. 3, a section on line $a\ b$ of Fig. 2; Fig. 4, a section on line $c\ d$ of Fig. 1; Fig. 5, a perspective view of the drag-shoe detached.

This invention relates to an improvement in wheel-drags, the object being to so arrange and connect the drag with the wheel and body of the cart that it may be applied to or removed from engagement with the wheel at the pleasure of the driver without requiring him to dismount from or stop the cart; and the invention consists in hanging the drag upon the hub of the wheel and connecting it with a revolving disk adjacent to the seat of the driver in the manner as hereinafter described, and particularly recited in the claims.

Upon the inner end of the hub A of one of the rear wheels I mount and permanently secure a grooved collar B to receive the inner end of the drag C, which is formed with an elongated opening D, permitting a certain amount of play upon the collar B, in the groove of which it is supported. At the outer end of the drag is a foot E, which extends beyond the tire of the wheel.

If desired, a shoe E' may be applied to the face of the foot, which shoe will receive all the wear of the drag, and when worn may be readily removed and another one substituted therefor.

Upon the side of the cart near the forward end and at a point convenient for the driver I mount a disk F, having a groove G in its periphery, upon a bolt H, and so that it may turn thereon, said bolt projecting beyond the disk to provide a space between the head of the bolt and the side of the disk for a spring I, the tendency of which is to bear the disk against the side of the body of the cart.

To form a bearing for the bolt, I preferably apply a plate J to the outer face and a plate K to the inner face of the body, which plates sustain the strain placed upon the disk F. Projecting outward from this plate is a stud L, and in the inner edge of the disk is a pin M, adapted to engage with said stud for the purpose hereinafter described. The outer edge of the disk is preferably provided with handles N, more or less in number, and by which the disk is readily revolved.

Secured to the outer end of the drag near the foot E is a chain O, which extends to and is secured in the groove G of the disk F. Secured to the upper or inner end of the drag is a chain P, which extends forward and is engaged with a stud Q in the face of the disk F, which face is also furnished with an eccentrically-mounted take-up or stud roller R.

In the normal position when the drag is in use the chain O is wound upon the disk F, as shown in Fig. 1, and the finger M, engaging with the stud L, holds it in this position. When it is desired to apply the drag, the operator forces the disk away from the cart against the spring I to allow the finger M to clear the stud L. The disk is then revolved by the handles N, which unwinds the chain O from the disk, allowing the drag to fall beneath the rim of the wheel. At the same time the revolution of the disk F causes the take-up roller R to engage with the chain P and draw it forward, as shown in Fig. 2, which draws the upper or inner end of the drag forward, forcing the lower end or foot beneath the rim of the wheel, which will rest thereon. When the drag is in this position, the finger M again engages the stud L and arrests the movement of the drag, and the wagon-wheel, being supported thereby, will ride upon it. When it is desired to remove the drag, the disk F is turned in the opposite direction, which releases the chain P and winds the chain O into the groove G and forces the drag out of engagement with the wheel, the leverage being such that this may be readily done by the driver without stopping the cart or backing it off the drag, as is frequently necessary with the drags as now employed.

I am aware that wheel-drags have been permanently connected with the cart and so as to be supported thereby, and therefore do not wish to be understood as claiming, broadly, such as my invention; but What I do claim is—

1. The combination of a wheel-drag formed at its inner end with a slot for engagement with the hub of a wheel, and at its outer end with a foot extending into the path of the wheel-rim, an adjusting-disk mounted upon the body of the cart, a chain connected with one end of said drag and with the periphery of said adjusting-disk and a chain connected with the opposite end of said drag and with the side of said disk, whereby said drag may be placed in or removed from an operating position, substantially as described.

2. The combination of a wheel-drag formed at its inner end with a slot for engagement with the hub of a wheel, and at its outer end with a foot extending into the path of the wheel-rim, an adjusting-disk mounted upon the body of the cart, and formed with a peripheral groove and provided with an eccentric stud upon its outer face, means for arresting the movement of said disk, a chain connected with one end of said drag and with the periphery of said disk, and a second chain connected with the opposite end of said drag and with the outer face of said disk, and so as to be engaged by said eccentric stud, substantially as described.

3. The combination of a wheel-drag formed at its inner end with a slot for engagement with the hub of a wheel, and at its outer end with a foot extending into the path of the wheel-rim, an adjusting-disk mounted upon an axle projecting from the side of the cart, upon which axle the disk is horizontally adjustable, said disk formed with a peripheral groove and provided upon its outer face with a take-up roller, means for arresting the movement of the said disk, and chains one extending from the lower end of said drag into engagement with said groove, and the other from the inner end of the drag to the face of said disk, substantially as described.

In testimony whereof I have signed this specification in the presence of two subscribing witnesses.

THOMAS G. CLIFFORD.

Witnesses:
JNO. H. BRENNAN,
LEWIS R. McCULLOCH.